United States Patent [19]

Lee

[11] Patent Number: 5,768,738
[45] Date of Patent: Jun. 23, 1998

[54] OPTICAL CONNECTOR CLEANER

[75] Inventor: Ho-Kyung Lee, Incheon, Rep. of Korea

[73] Assignee: Daewoo Telecom Ltd., Rep. of Korea

[21] Appl. No.: 702,408

[22] Filed: Aug. 14, 1996

[30] Foreign Application Priority Data

Aug. 14, 1995 [KR] Rep. of Korea ...................... 95-20923

[51] Int. Cl.$^6$ .................................................. A47L 25/00
[52] U.S. Cl. ........................................... 15/210.1; 15/97.1
[58] Field of Search .................................. 15/97.1, 103.5, 15/210.1

[56] References Cited

U.S. PATENT DOCUMENTS 3,708,818  1/1973  Hotz ......................................... 15/97.1
5,117,528  6/1992  Kanayama ............................. 15/210.1
5,220,703  6/1993  Kanayama ............................. 15/210.1

*Primary Examiner*—David Scherbel
*Assistant Examiner*—Terrence R. Till
*Attorney, Agent, or Firm*—Pennie & Edmonds LLP

[57] ABSTRACT

An optical connector cleaner includes a cloth for cleaning a ferrule end surface, a casing for protecting the cloth provided with a portion for inspecting a ferrule end surface, a guide member arranged in the casing and formed with a plurality of various-shaped holes into which a ferrule can be inserted and moved therealong, and a unit of moving guide member, by which it is possible not only to accommodate and clean various shapes of the ferrule end surfaces, but also to inspect the cleaned ferrule end surface at optical connector junction job sites or in the manufacturing process thereof.

12 Claims, 7 Drawing Sheets

OPTICAL CONNECTOR CLEANER

FIELD OF THE INVENTION

The present invention relates to an optical connector cleaner for cleaning a ferrule end surface; and more particularly, to an optical connector cleaner utilized at optical connector junction job sites or in the manufacturing process thereof.

BACKGROUND OF THE INVENTION

Conventionally, optical connectors of various types have been used to facilitate connection or disconnection of optical fibers. For instance, in the case of a single fiber connector, an optical fiber is bonded at the center of a cylindrical rod called a cylindrical ferrule; the cylindrical ferrule is inserted into a precisely-formed cylindrical hollow portion of an alignment sleeve of the connector, so that two opposing ferrule end surfaces can be butted and connected to each other for the alignment of two opposite fibers. Further, in the case of a multifiber connector, a plurality of fibers are arranged in predetermined positions and bonded to a resin cubic body called as a cubic ferrule; and then two cubic ferrules are engaged with each other via two guide pins and two small-diameter guide holes so that two opposing ferrule end surfaces of a plurality of arranged fibers are butted and connected to each other for the alignment of two opposite fibers, respectively.

The optical connector is widely used, particularly, in the optical communication field, because the optical connector is provided with excellent connection characteristics. However, since two opposite end surfaces of the optical fibers are directly connected to each other in the optical connector, the connection characteristics are markedly deteriorated in case the ferrule end surfaces are contaminated by contaminants such as dust or oil. Therefore, it is indispensable to clean the ferrule end surfaces before the ferrules are connected to each other.

Figure 1:
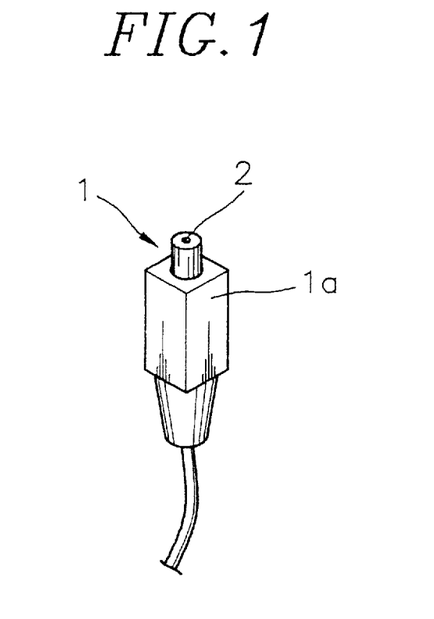
FIG. 1 shows an optical fiber connector and a ferrule attached to the plug body of the optical fiber connector.
Figure 2:
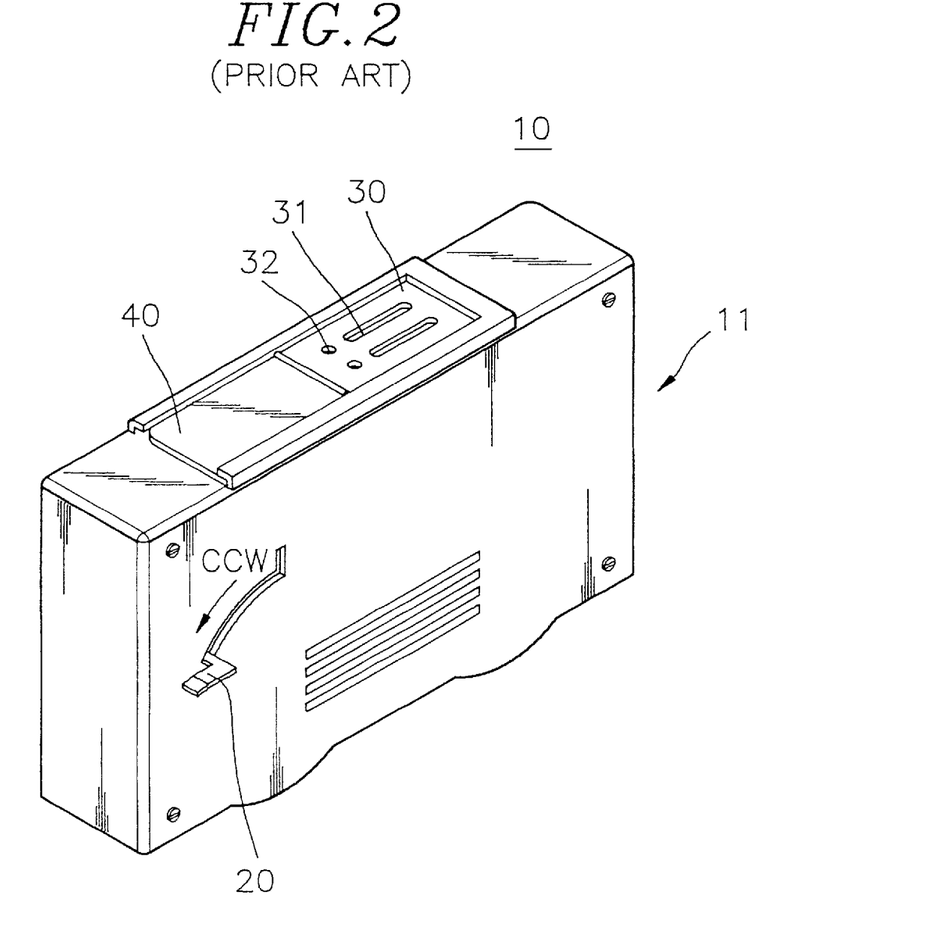
FIG. 2 illustrates a perspective view of a conventional optical connector cleaner.

FIG. 1 shows an optical fiber connector 1 and a ferrule 2 attached to the plug body la of the optical fiber connector 1 and FIG. 2 illustrates a conventional optical connector cleaner 10 for cleaning an end surface of the ferrule 2.

As shown in FIG. 2, the optical connector cleaner 10, which is disclosed in U.S. Pat. No. 5,117,528 issued to Kazunori Kanayama, etc., includes a casing 11, a reel lever 20, a guide member 30 and a slidable cover 40. The guide member 30 is provided with two pairs of holes 31, 32 in such a way that the ferrule 2 attached to the plug body la of the optical connector 1 is allowed to be inserted thereinto and moved therealong.

Figure 3:
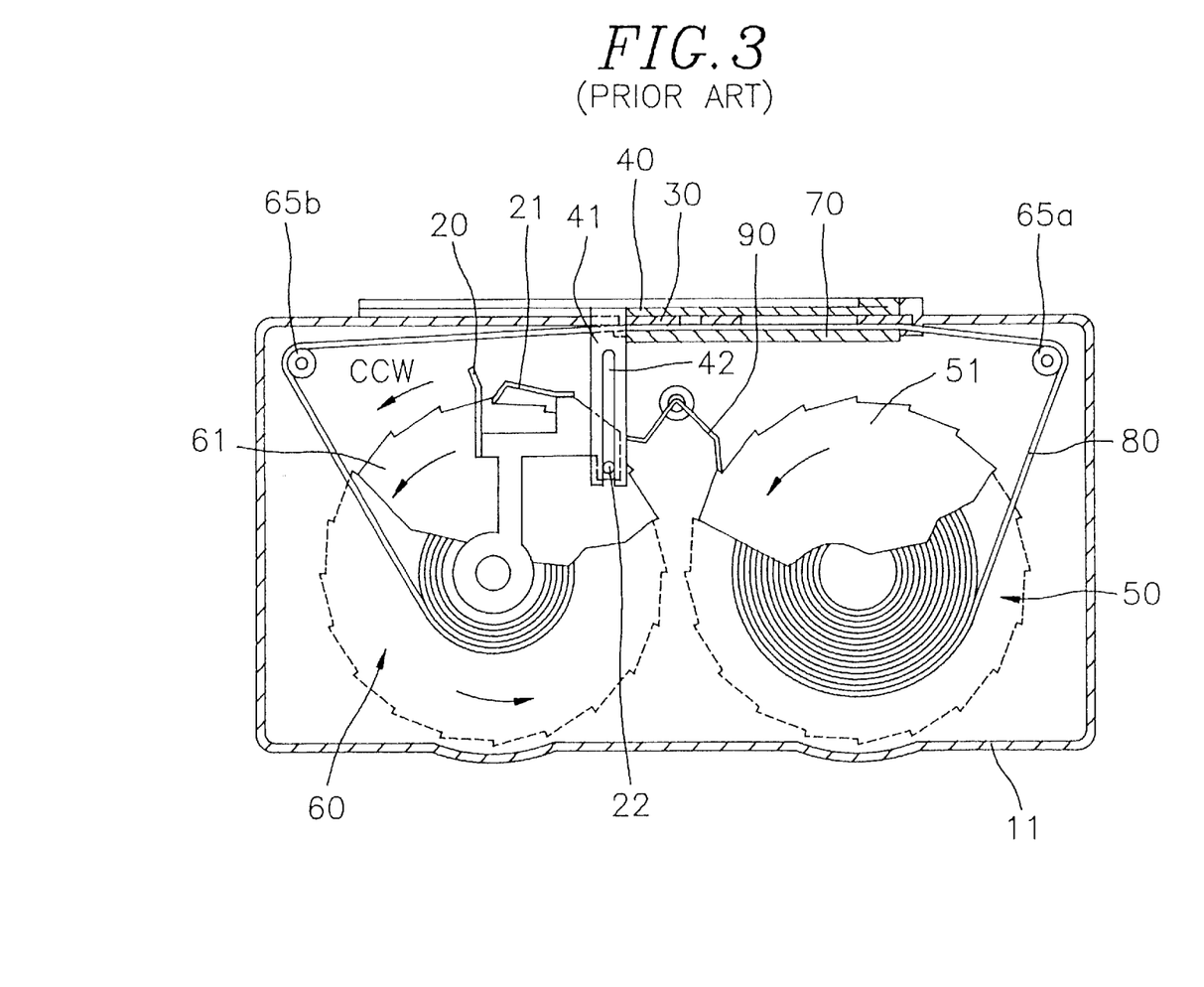
FIG. 3 presents a cross sectional view of the conventional optical connector cleaner before use.

FIG. 3 shows a state of the optical connector cleaner before use in more detail, wherein a supply reel 50, a take-up reel 60, a first and a second guide rollers 65a, 65b and a flat elastic member 70 are arranged and a cleaning cloth 80 is enclosed within the casing 11, respectively.

The supply reel 50, the take-up reel 60 and the pair of guide rollers 65a, 65b are rotatably supported by the casing 11 via their corresponding shafts (not shown), respectively. Further, the supply reel 50 is formed with a pair of supply reel ratchet wheels 51 (only one shown) between which the cleaning cloth 80 is wound, and the take-up reel 60 is formed with a pair of take-up reel ratchet wheels 61 (only one shown) between which the cleaning cloth 80 is wound.

The flat elastic member 70 is disposed under the cleaning cloth 80 in such a way that the flat elastic member 70 can apply an elastic pressure to the ferrule end surface to be cleaned when the ferrule end surface is pushed against the cleaning cloth 80.

The reel lever 20 is pivotally attached at the center of the take-up reel ratchet wheels 61, in such a way that the lever 20 can rotate independently from the ratchet wheels 61. The reel lever 20 is provided with a take-up reel drive pawl 21 engaged with one of teeth on one of the take-up reel ratchet wheels 61 and a slidable cover moving pin 22.

The guide member 30 is sandwitched between the slidable cover 40 and a cleaning cloth 80.

The slidable cover 40 is slidably disposed on the upper surface of the casing 11 and formed with an inwardly extending pin guide plate 41 in which an open slot 42 is formed so as to be engaged with the slidable cover moving pin 22. Further, between the two pairs of the ratchet wheels 51, 61 is pivotally disposed a bifurcated pawl 90 for preventing reverse rotational motion of each of the supply and take-up reel ratchet wheels 51 and 61.

The tape-shaped cleaning cloth 80 wound around the supply reel 50 is guided via the first guide roller 65a, passing between the guide member 30 and the elastic member 70, guided via the second guide roller 65b, and then wound around the take-up reel 60.

Figure 4:
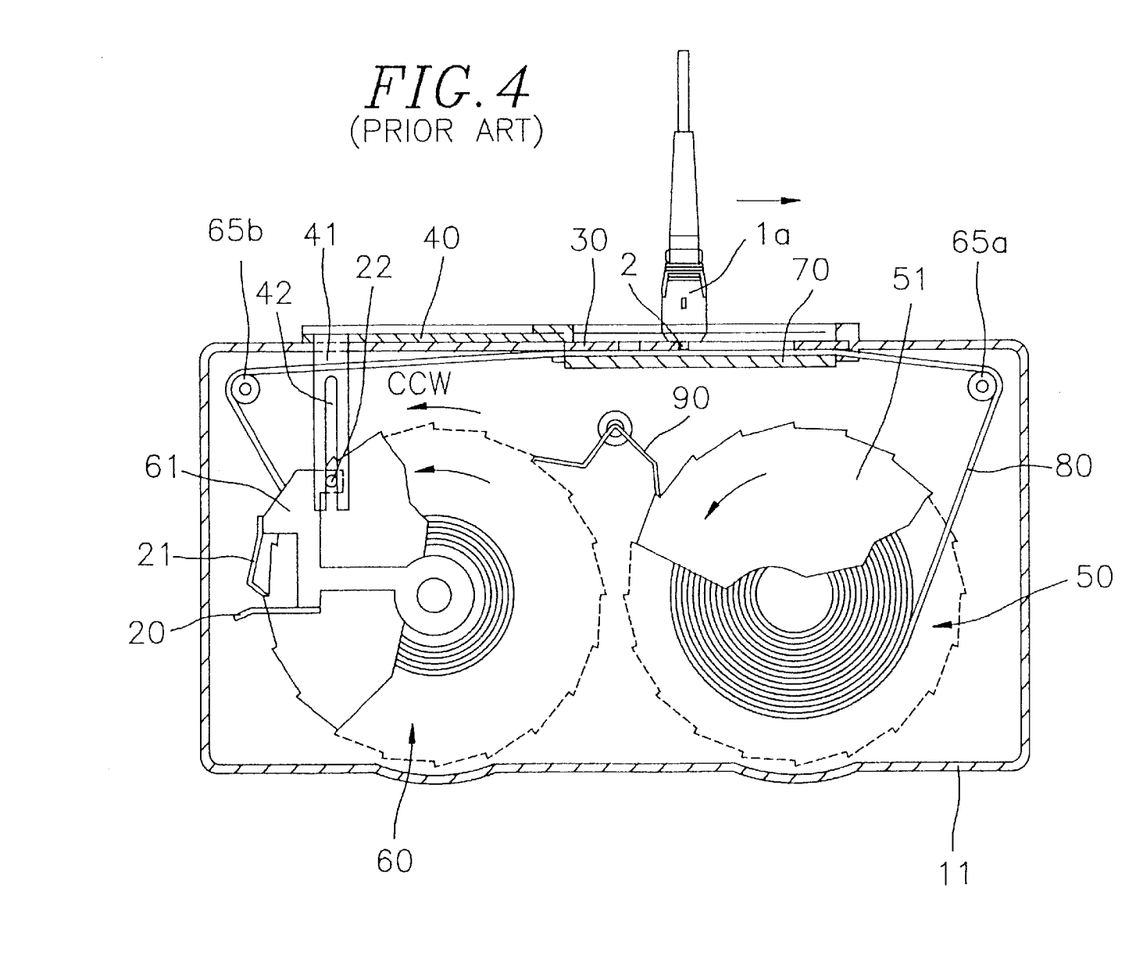
FIG. 4 represents a cross sectional view of the conventional optical connector cleaner after use.

Under these conditions, the slidable cover 40 covers the holes 31, 32 of the guide member 30, and the reel lever 20 is positioned roughly vertically. When the reel lever 20 is pivoted about the center of the ratchet wheels 61 counterclockwise CCW as indicated with the arrow, the take-up reel drive pawl 21 rotates the take-up reel ratchet wheels 61, so that the cleaning cloth 80 is shifted by predetermined stroke between the guide member 30 and the elastic member 70. At the same time, since the slidable cover 40 is moved along an opening (not shown) formed at the front surface of the casing 11, the guide member 30 is exposed; that is, the cleaning cloth 80 is exposed, as shown in FIG. 4.

Thereafter, the ferrule 2 of the optical connector 1 is inserted into one of the holes 31, 32 of the guide member 30 so that the ferrule end surface is brought into pressure contact with the cleaning cloth 80 on the elastic member 70. In cleaning operation, the ferrule 2 is cleaned by rotating it through the hole 31 or by moving it along the hole 32.

Further, after the ferrule end surface has been cleaned, the reel lever 20 resumes the original position as shown in FIG. 3. In this case, the drive pawl 21 is moved back to the original position by passing over several teeth of the take-up ratchet wheels 61 clockwise, while the reverse motion of the two pairs of the ratchet wheels 51 and 61 are prevented by the bifurcated pawl 90, leaving them in the rotated position.

However, in such an optical connector cleaner, since the number or the shape of the holes of the guide member are limited, they can not accommodate various shapes of the ferrule end surfaces. In addition, after cleaning the ferrule end surface, there is no way to check a cleaning degree thereof.

SUMMARY OF THE INVENTION

It is, therefore, an object of the present invention to provide an optical connector cleaning capable of accommodating various shapes of the ferrule end surface.

Another object of the present invention to provide an optical connector cleaning capable of inspecting the cleaned ferrule end surface at junction job sites or in the manufacturing process thereof.

In accordance with one aspect of the present invention, there is provided an optical connector cleaner for cleaning a ferrule end surface of an optical connector, which comprises: a cloth for cleaning the ferrule end surface, a casing for protecting the cleaning cloth, the casing being formed with an opening, a guide member provided with a plurality of various-shaped holes into which the ferrule can be inserted and moved therealong in contact with part of the surface of the cleaning cloth, the guide member being rotatably arranged at the casing in such a way that a part thereof is allowed to be exposed through the opening of the casing and the cloth is permitted exposed through the holes thereof, and an unit for moving the guide member.

In accordance with another aspect of the present invention, there is provided an optical connector cleaner for cleaning a ferrule end surface of an optical connector, which comprises: a cloth for cleaning the ferrule end surface, a casing for protecting the cleaning cloth, the casing being formed with at least one hole into which the ferrule can be inserted and moved therealong in contact with part of the surface of the cleaning cloth and a portion for inspecting the ferrule end surface, and devices for shifting the cleaning cloth exposed through the hole for cloth renewing, after the ferrule end surface has been rubbed with the cleaning cloth along the hole formed in the casing.

BRIEF DESCRIPTION OF THE DRAWINGS

The above and other objects and features of the present invention will become apparent from the following description of preferred embodiments, when taken in conjunction with the accompanying drawings, wherein.

DETAILED DESCRIPTION OF THE PREFERRED EMBODIMENTS

It should be noted that like parts appearing in FIGS. 1 to 7 are represented by like reference numerals so that descriptions concerning these parts are not repeated for the sake of simplicity.

Figure 5:
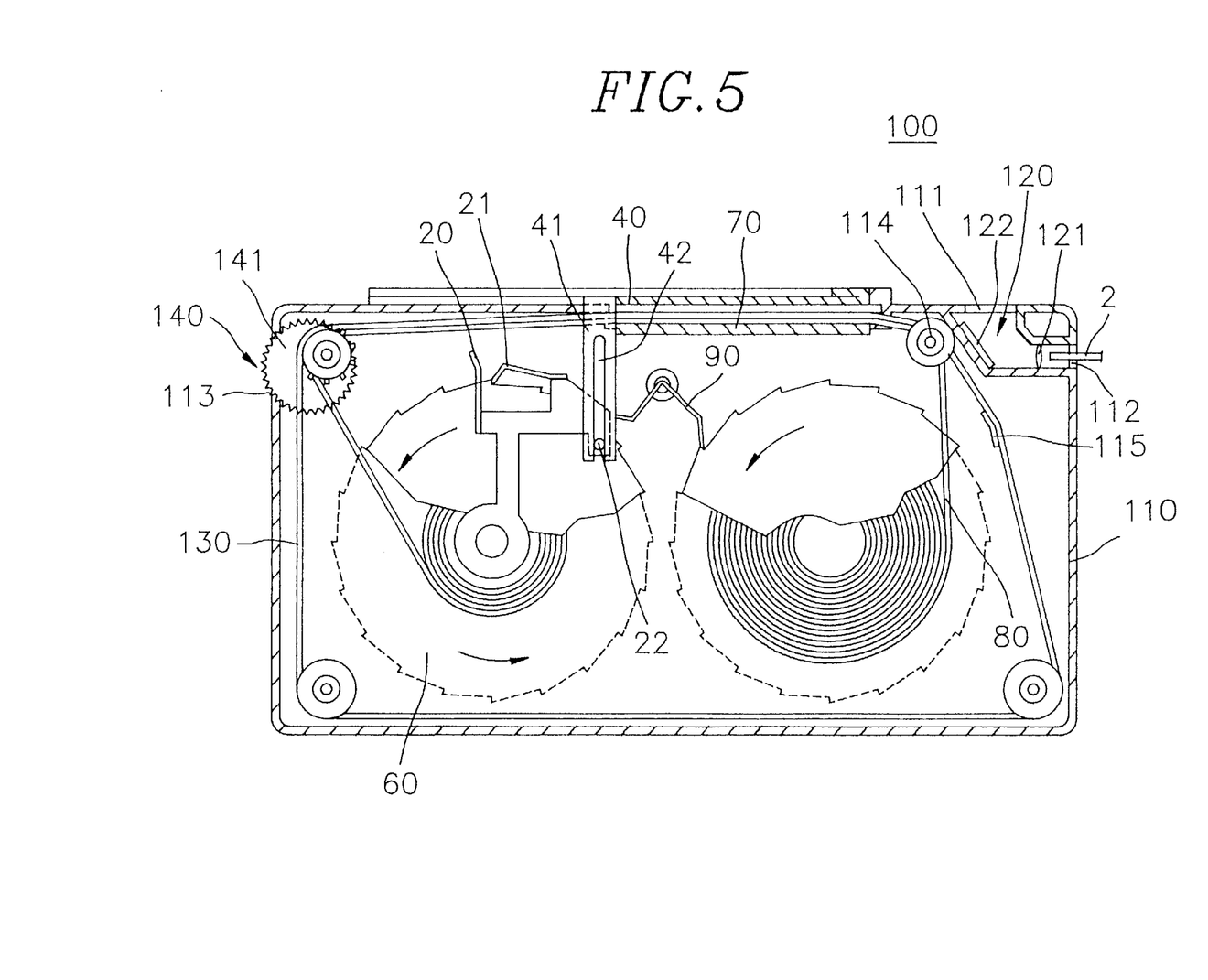
FIG. 5 depicts a rear sectional view of an optical connector cleaner in accordance with the present invention.

Referring to FIG. 5, the inventive optical connector cleaner 100 includes a casing 110, a portion 120 for inspecting the ferrule end surface, a belt-type guide member 130 and a unit 140 for moving the guide member 130.

The casing 110 having a substantially rectangular shape is formed with an inspection window 111 on its front surface and a through hole 112 on its right surface, respectively. The casing 110 is further formed with a side opening 113 on its left surface so that an outer circumferential portion of a main gear 141, which will be described in detail later (see FIG. 7), can be exposed therethrough and therefore rotated manually by the user. On the other hand, the casing 110 includes four rollers 114 for guiding the cleaning cloth 80, each of the rollers 114 being positioned at respective corner thereof.

The inspection portion 120 having a lens 121 and a mirror 122 is provided at one corner of the casing 110 so as to inspect the ferrule end surface after cleaning it. In detail, the lens 121 is provided in the casing 110 so as to magnify the ferrule end surface inserted into the through hole 112 and also the mirror 122 is provided in the casing 110 so as to reflect the magnified image of the ferrule end surface toward the inspection window 111.

Figure 6:
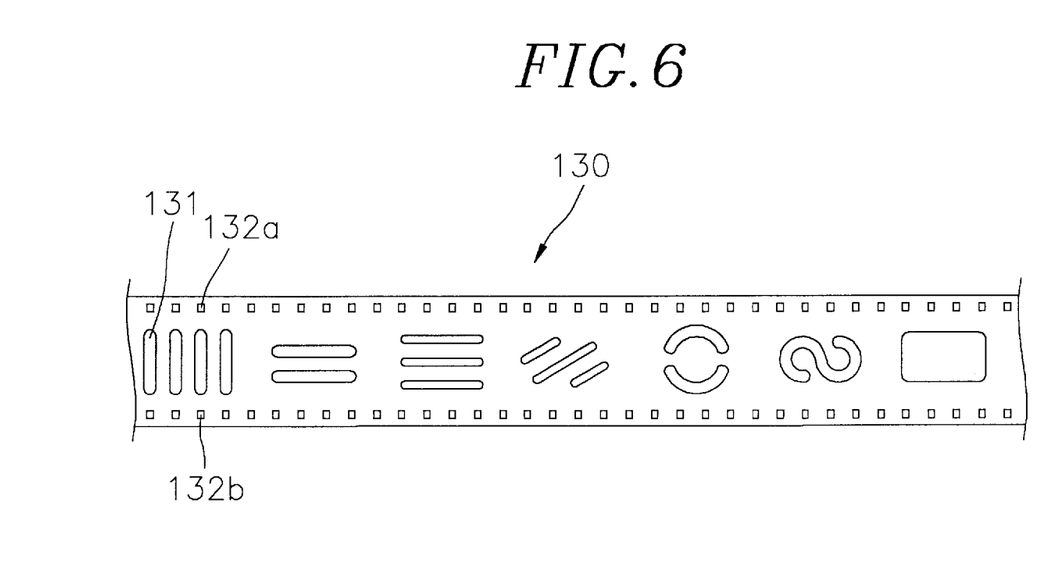
FIG. 6 discloses a partial plan view of a guide member in accordance with the present invention.

As shown in FIG. 6, the belt-type guide member 130 made of a soft material such as rubber and arranged in the casing 110 is formed with a plurality of various-shaped holes 131 into which the ferrule 2 attached to the plug body 1a of the optical connector 1 can be inserted and moved therealong in contact with part of one surface of the cleaning cloth 80; and two chains of grooves 132a, 132b formed on the upper and the lower end sides thereof, respectively. Further, it is possible that the holes for guiding the ferrule end surface may be directly formed in the front surface of the casing.

Figure 7:
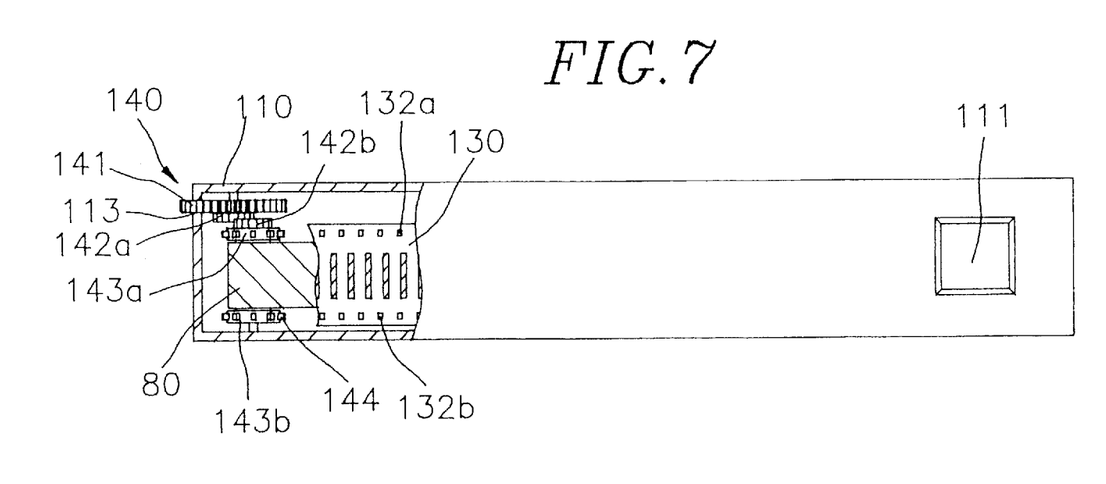
FIG. 7 offers a partial cutaway front view of an optical connector cleaner in accordance with the present invention.

With reference to FIG. 7, the guide member moving unit 140, which includes an external force transferring element, e.g., a main gear 141, a first and a second interconnected gears 142a, 142b and a pair of relocating gears 143a, 143b, are provided at another corner of the casing 110.

The main gear 141 is partially exposed through the side opening 113 of the casing 110 so as to be rotated by the user and is united with the first interconnected gear 142a coaxially mounted thereto. The second interconnected gear 142b is engaged with the first interconnected gear 142a and is united with the upper relocating gear 143a coaxially mounted thereunder to transfer the rotational force from the main gear 141 thereto. The lower relocating gear 143b is coaxially connected with the upper relocating gear 143a through a shaft(not shown) fixed to the casing 110 so as to rotate together with it. Furthermore, each of the relocating gears 143a, 143b is provided with a plurality of teeth 144 along the circumferential surface thereof in such a way that each tooth 144 is allowed to be inserted into the corresponding groove of the guide member 130. Note that the relocating gear shaft rotates independently from the roller 114 for guiding the cleaning cloth 80.

In such an arrangement, when the main gear 141 is rotated by the user, its rotational force is transferred to the relocating gears 143a, 143b via the first and the second interconnected gears 142a, 142b. At the same time, the teeth 144 of the relocating gears 143a, 143b are allowed to be sequentially inserted into and freed from the matching grooves 132a, 132b of the guide member 130, respectively, making temporal contact therebetween to move the guide member 130. In order to improve the traveling of the guide member 130, it is preferable that the casing 110 be provided with a guide wall 115. When a hole is selected from the holes 131 of the guide member 130, the main gear 141 is stopped by the user.

In such an optical connector cleaner, it is possible not only to accommodate various shapes of the ferrule end surfaces, but also to inspect the cleaned ferrule end surface at optical connector junction job sites or in the manufacturing process thereof.

While the present invention has been described with respect to certain preferred embodiments only, other modifications and variations may be made without departing from the scope of the present invention as set forth in the following claims.

What is claimed is:

1. An optical connector cleaner for cleaning a ferrule end surface of an optical connector, which comprises:

a cloth for cleaning the ferrule end surface;

a casing for protecting the cleaning cloth, the casing being formed with an opening;

a guide member provided with a plurality of various-shaped holes into which the ferrule end surface can be inserted and moved therealong in contact with part of one surface of the cleaning cloth, the guide member being rotatably arranged in the casing in such a way that a part thereof is allowed to be exposed through the opening of the casing and the cloth is permitted exposed through the holes thereof; and means for moving the guide member.

2. The optical connector cleaner of claim 1, wherein the guide member moving means includes an external force transferring element, a guide member rotating element, and an energy connecting element for transferring the external force from the external force transferring element to the guide member rotating element.

3. The optical connector cleaner of claim 2, wherein the guide member moving means further includes a plurality of rollers for guiding the guide member.

4. The optical connector cleaner of claim 2, wherein the external force transferring element is a gear and the casing is further formed with a second opening so that the outer circumferential portion of the gear is allowed to be exposed therethrough.

5. The optical connector cleaner of claim 2, wherein the guide member rotating element is a pair of gears, one gear connected with the energy connecting element, other gear united with said gear so as to rotate together with said gear.

6. The optical connector cleaner of claim 5, wherein the guide member is further provided with two chains of grooves, and each of the gears is provided with a plurality of teeth along the circumferential surface thereof in such a way that teeth are allowed to be inserted into and freed from the matching grooves of the guide member to move the guide member.

7. The optical connector cleaner of claim 2, wherein the energy connecting element is a pair of gears, one gear united with the external force transferring element and coaxially mounted thereto, and another gear united with the guide member rotating element, the gears being engaged with each other.

8. The optical connector cleaner of claim 1, wherein the casing is further provided with a guide wall for improving the traveling of the guide member.

9. An optical connector cleaner for cleaning a ferrule end surface of an optical connector, which comprises:

a cloth for cleaning the ferrule end surface; a casing for protecting the cleaning cloth, the casing having at least one hole into which the ferrule end surface can be inserted and moved therealong in contact with part of one surface of the cleaning cloth, and further having a portion for inspecting the ferrule end surface; and means for shifting the cleaning cloth exposed through the hole for cloth renewing, after the ferrule end surface has been rubbed with the cleaning cloth along the hole formed in the casing.

10. The optical connector cleaner of claim 9, wherein the shifting means includes a supply reel for supplying the cleaning cloth and a take-up reel for taking-up the cleaning cloth from the supply reel.

11. The optical connector cleaner of claim 10, wherein the shifting means further includes a first guide roller for guiding the cleaning cloth disposed at the supply reel side and a second guide roller for guiding the cleaning cloth disposed at the take-up reel side.

12. The optical connector cleaner of claim 9, wherein the casing is further provided with an inspection window and through hole, and said portion for inspecting the ferrule end surface has a lens and a mirror, in such a way that the lens is allowed to magnify the ferrule end surface inserted into the through hole of the casing and the mirror is permitted to reflect the magnified image of the ferrule end surface toward the inspection window of casing.

\* \* \* \* \*